United States Patent Office 2,989,423
Patented June 20, 1961

2,989,423
COATED FABRICS AND PROCESS THEREFOR
Alfred Bruce Malmquist, Stoney Point, and Raymond James Mayfield, Jr., Newburgh, N.Y., assignors to E. I. du Pont de Nemours and Company, Wilmington, Del., a corporation of Delaware
No Drawing. Filed Mar. 12, 1959, Ser. No. 798,799
6 Claims. (Cl. 117—145)

This invention relates to vinyl resinous coated fabrics which are printable by established printing methods and to improved methods of making the same. The products of the preferred embodiments described herein are especially useful as book cover materials.

Most of the books produced in recent years have been bound and covered with a coated fabric material made by applying a pigmented and plasticized pyroxylin solution to a sized fabric, followed by drying and smooth calendering the coating. These conventional pyroxylin book cover materials are hazardous to produce because of the toxicity and flammability of the volatile organic solvents used. And unless costly solvent recovery equipment is installed, large quantities of solvent are wasted. Unfortunately, a plurality of coats of the solution are required to make even the lighter grade cover materials commonly referred to as "impregnated bookcloth," which usually involve a dry coating weight of about 1.5–2.0 ounces per sq. yd. There are also important limitations in the cover materials themselves. For example, the presence of plasticizing oils leads to problems in blanking and printing. Books covered with the product exhibit damage at corners, edges and hinges after severe or extended use.

Attempts to make improved book cover materials by replacing the pyroxylin coating composition with tougher synthetic polymer compositions, such as those based on vinyl chloride polymers, have not heretofore been entirely successful. Multiple-coat solution coating systems have still been required in most cases. Improvements in durability have almost invariably been accompanied by a sacrifice in other important book cover properties, such as printing ink receptivity and adhesion, adaptability to the automatic assembly operations at the bindery, compatibility with bindery adhesives and overprint lacquers, and freedom from harmful plasticizer migration on extended contact with other books covered with materials containing migrating plasticizers or furniture finished with lacquer type finishes.

An object of this invention, therefore, is to provide an improved product and method of making a printable coated fabric.

It is also an object to provide a single-coat method of making printable impregnated and/or coated book cover materials.

Another object is to provide a novel book cover material having enhanced durability and which is substantially free of the inherent disadvantages of prior pyroxylin and vinyl book cover materials.

A further object is to provide a durable book cover material adapted to lithographic printing.

A still further object is to provide a durable book cover material adapted to blank-embossing followed promptly with printing by methods other than lithography.

Other objects will become apparent from the following description of the invention.

Briefly stated, the objects of the present invention are accomplished by applying to a textile fabric a layer of an aqueous dispersion of (A) a mixture of certain synthetic polymers and (B) finely divided inert material including at least one pigment, and drying said layer. On a weight basis, each 100 parts of component (A) consists essentially of (1) about 25 to 75 parts of a vinyl chloride polymer, (2) about 25 to 75 parts of an acrylic copolymer derived from reacting about 94 to 99% by weight of a methyl, ethyl, propyl or butyl ester of acrylic and/or methacrylic acid with about 1 to 6% by weight of acrylic, methacrylic and/or itaconic acid, and (3) zero to about 35 parts of a copolymer of butadiene and acrylonitrile, with the latter preferably not exceeding the amount of the (2) acrylic copolymer. Component (B) is present in a weight ratio of about 10 to 100 parts per 100 parts of component (A).

The invention will be illustrated but not limited by the following examples in which all quantities are given on a weight basis unless otherwise indicated.

Example 1

Illustrated in this example is the production of a colored impregnated type of book cover material.

A continuous length of bleached and red-dyed cotton sheeting measuring 40 inches in width and having a weight of 3.6 ounces per sq. yd. is preferably size-coated on one side (ultimately the "back" side) with the following composition:

| Back size composition: | Parts by weight—dry basis |
|---|---|
| Polyvinyl acetate, Du Pont "Elvacet" 81–900 (aqueous dispersion of 55% solids) | 32.25 |
| China clay | 43.00 |
| Starch | 21.45 |
| Sodium salt of carboxymethyl cellulose, high viscosity grade (2.6% solution in water) | 1.12 |
| Animal glue | 2.18 |
| | 100.00 |

The back size composition is described in greater detail in U.S. Patent 2,650,170.

Sufficient of the above size composition is doctor-knifed onto the fabric to result in a coating weight after drying of about 0.4 oz. per sq. yd. Drying is performed by passing the material through a heat zone. The back sizing is an optional operation to improve the adhesion of the book cover material to paper binder boards and may be omitted in those cases where the adhesion to the binder boards is not critical.

Next, the following aqueous dispersion coating composition is doctor-knifed onto the unsized or "front" side (ultimately the normally exposed side) of the fabric to a thickness sufficient to yield a dry coating weight of 1.8 ounces per sq. yd:

| Coating Composition | Parts by Weight | |
|---|---|---|
| | Wet Basis | Dry Basis |
| Pigment and Filler (2 parts red pigment and 28 parts calcium carbonate) | 30 | 30 |
| Aqueous Dispersion of "Rhoplex" B-15 [1] | 87 | 40 |
| Toluol | 3 | |
| Aqueous Dispersion of "Chemigum" 235 CHS [2] | 22 | 9 |
| Aqueous Dispersion of Latex #744B [3] | 40 | 20 |
| Aqueous Dispersion of "Acrysol" G.S. [4] | 8 | 1 |
| | 190 | 100 |

[1] Aqueous dispersion of a copolymer of about 83% ethyl acrylate, 15% methyl methacrylate and 2% methacrylic acid, 46% solids.
[2] Aqueous dispersion of a copolymer of about 55% butadiene and 45% acrylonitrile, 41% solids.
[3] Aqueous dispersion of a copolymer of about 75% vinyl chloride and 25% vinylidene chloride, 50% solids.
[4] Aqueous dispersion of sodium polyacrylate, 12.5% solids.

The above coating composition is prepared by first dispersing the pigment and filler in about 75 parts of the "Rhoplex" B–15 by means of the sand grinding method described in U.S. Patents 2,581,414 and 2,855,156. About 3 parts of "Acrysol" G.S. is added after grinding to help suspend the pigment and filler in the "Rhoplex" B–15. Then the balance of the ingredients are admixed individually with the resulting dispersion in the order shown.

The sized and coated fabric is passed through a heat zone to expel the volatile components and while still hot, it is calendered between heated rolls to improve the smoothness of the front side. Cooling and winding on a storage reel complete the operations for producing the product of this example.

The resulting coated-fabric product, a colored impregnated bookcloth, is an excellent book cover material for several reasons. For example, it can be readily printed and decorated by conventional non-lithographic methods such as ink stamping, metallic foil stamping, letterpress printing, silk screening and gravure printing. Ink reception and adhesion are entirely satisfactory. Ordinary bindery adhesives and automatic bookmaking machinery can be used when covering books with it. Since the impregnating composition contains no plasticizer, books covered with the product of this example do not mar the lacquer type finished furniture or the surfaces of other books covered with materials containing migrating plasticizers with which they are in contact for extended periods of time.

Book covers made from the product of this example have good resistance to damage from moisture, rubbing, scuffing, folding at the hinge, and general wear.

Five books bound with the product of this example and five books bound with conventional pyroxylin-coated cover material of comparable weight were tested for resistance to wear and general abuse in accordance with the following "tumble test": The 10 books are placed in a covered wooden box measuring about 6 ft. long, 3 ft. wide and 2 ft. deep, the inner surfaces of which are roughened in a cross-hatched groove pattern, and the two ends of which are lined with a heavy duck fabric. The box is rotated end over end at 5½ r.p.m. for 1500 cycles, with the test books sliding across 12 feet of the wooden interior and hitting both ends of the box during each cycle. Upon examination after testing, the books covered with the product of this example show little wear and suspend the pigment and filler in the "Rhoplex" B–15. considerable cracking at the folds and edges, whereas the pyroxylin covered control samples show extensive edge wear and considerable cracking at the folds.

A distinct advantage of the coating method described in this example is that water is the principal liquid ingredient used in the coating composition, thus overcoming the fire hazard and expense associated with prior art solution coating methods. Equally important, only a single coat of the coating composition is required to yield a durable and printable surface. This unexpected advantage obviously has considerable economic significance.

The surprisingly durable coated fabric produced in this example is also useful as a wall-covering material, in view of the ease with which the product can be adhered to the wall and further, the exposed surface is unusually receptive to latex type wall paints when redecorated.

*Example 2*

A red-colored "full-coated bookcloth" type of book cover material is produced as follows in the same manner described above in Example I except an additional 1.3 ounces per sq. yd. (dry basis) of the same coating is applied to the front side of the product by adjusting the tension on the fabric as it passes under the doctor knife to deposit a total dry coating weight of 3.1 ounces per sq. yd. on the unsized side of the fabric.

Upon its removal from the drying oven, the coated fabric is cooled. The front side is then further coated, by means of a doctor knife, with 0.2 ounces per sq. yd. (dry basis) of an 11% solution of cellulose nitrate dissolved in an 80–20 mixture of ethyl acetate and ethyl alcohol. After passing through a heat zone, the cellulose nitrate coating is firmly bonded to the base coating. This is surprising and unexpected, since cellulose nitrate is incompatible with most vinyl resins and does not adhere to them.

Employing a conventional heated embossing roll, the front side of the product is embossed in an attractive leather-like grain. As the product leaves the embossing apparatus, it is cooled on a cold drum and finally wound up on a storage reel.

The rich-textured product of this example is especially adapted for printing and useful as a fully coated bookcloth; that is, as a cover for books which are used repeatedly over a relatively long period of time, such as encyclopedias and other reference books. It is generally much more durable than conventional book cover materials of comparable weight made by applying several solution coats of a plasticized pyroxylin composition to the fabric; as evidenced by the tumble test described in Example 1.

Furthermore, when the product of the present example is blank-embossed (flattening a previously embossed area) with a heated blanking die in preporation for decorating with foils and printing with inks, there is no objectionable exudation of plasticizing fluids. Hence, the blanked area is immediately receptive to the inks and foils, and adhesion thereof is exceptional.

*Example 3*

This example illustrates the production of a white impregnated bookcloth adapted for lithographic printing by employing an aqueous dispersion coating composition similar to that of Example 1.

The method of Example 1 is repeated with the following exceptions:

The fabric is bleached but not dyed. The coating composition of Example 1 is modified so that the pigment and filler component consists of 15 parts titanium dioxide and 15 parts calcium carbonate.

The front side of the sized and coated fabric, after it is smooth calendered and cooled, is further doctor-knife coated with 0.2 ounce per sq. yd. (dry basis) of cellulose nitrate from an 11% solution thereof in an 80/20 mixture of ethyl acetate and ethyl alcohol, followed by force drying of the coating. The vinyl resin base coating is surprisingly receptive to the cellulose nitrate coating.

The product of this example has substantially the same desirable properties as that of Example 1. In addition, it is adapted for lithographic printing as evidence by the following printability test: 2800 sheets of book cover size measuring about 18 in. x 23 in. are cut from the product and printed in accordance with conventional lithographic practice. The ink is a standard drying-oil-modified alkyd resin lithographic ink of the type described in U.S. Patent 2,049,507. Ink receptivity and coverage on the sheets are excellent. Contrary to what usually happens with book covers made by coating fabric with a vinyl chloride polymer composition containing ordinary plasticizers, the printing plate does not "go blind," a term indicating that the plate becomes non-receptive to the ink.

Several of the lithographed sheets are transfer-roll coated with a standard bindery overprint cellulose nitrate lacquer. Drying time and adhesion of the lacquer are satisfactory. The coated surface does not become tacky upon aging the samples for two months at 100° F. Prior art book covers of the plasticized vinyl chloride polymer coated type become tacky when decorated with lacquer type compositions.

*Example 4*

A color impregnated bookcloth similar to the one produced in Example 1 is made by repeating that example except that the coating composition is replaced with the following composition:

| Coating Composition | Parts by Weight | |
|---|---|---|
| | Wet Basis | Dry Basis |
| Pigment and Filler (2 parts red pigment and 8 parts calcium carbonate) | 10 | 10 |
| Aqueous Dispersion of "Rhoplex" B-15 (Same as Ex. 1) | 98 | 45 |
| Toluol | 3 | |
| Aqueous Dispersion of Dow Latex #744B (Same as Ex. 1) | 88 | 44 |
| Aqueous Dispersion of "Acrysol" G.S. (Same as Ex. 1) | 8 | 1 |
| | 207 | 100 |

*Example 5*

A colored impregnated bookcloth having properties similar to the one produced in Example 1 is made by repeating that example except the coating composition is replaced with the following composition:

| Coating Composition | Parts by Weight | |
|---|---|---|
| | Wet Basis | Dry Basis |
| Pigment and Filler (3 parts red pigment and 42 parts calcium carbonate) | 45 | 45 |
| Aqueous Dispersion of "Rhoplex" B-15 (Same as Ex. 1) | 78 | 36 |
| Aqueous Dispersion of "Chemigum" 235 CHS (Same as Ex. 1) | 10 | 4 |
| Aqueous Dispersion of Dow Latex #744B (Same as Ex. 1) | 28 | 14 |
| Aqueous Dispersion of "Acrysol" G.S. (Same as Ex. 1) | 8 | 1 |
| | 169 | 100 |

*Example 6*

This example illustrates the production of a white impregnated bookcloth which is eminently adapted for lithographic printing and useful as a cover material for such books as lithographed text books.

A continuous length of bleached cotton sheeting weighing 3.6 oz. per sq. yd. and measuring 40 inches wide is doctor-knife coated on one side (ultimately the "front") with the following composition:

| Coating Composition | Parts by Weight | |
|---|---|---|
| | Wet Basis | Dry Basis |
| Pigment and Filler (10 parts rutile titanium dioxide and 20 parts "Camelwite" calcium carbonate) | 30 | 30 |
| Aqueous Dispersion of "Rhoplex" B-15 (As in Ex. 1) | 76 | 35 |
| Aqueous Dispersion of "Geon" 450X6 [1] | 70 | 35 |
| | 176 | 100 |

[1] 50% aqueous dispersion of a slightly modified vinyl chloride copolymer in which the vinyl chloride polymer predominates and has been copolymerized with lesser, but modifying ratios of vinylidene chloride and vinyl acetate.

The fabric is first coated with the above composition to a thickness sufficient to yield a dry coating weight of 1.2 ounces per sq. yd. This coating is force dried. A second coat of the same composition is doctor-knifed over the first coat in the amount of 0.6 ounce per sq. yd. (dry weight), and dried in the same way resulting in a total dry coating weight of 1.8 oz. per sq. yd.

The above coating composition is prepared by first dispersing the pigment and filler in the "Geon" 450×6 aqueous dispersion by means of the sand grinding method referred to in Example 1. Then the "Rhoplex" B-15 aqueous dispersion is thoroughly admixed with the resulting dispersion.

While still hot, the coated fabric coming from the drying oven is passed through a standard smoothing calender comprising a smooth steel roll heated to about 250–275° F. and a paper-covered roll. With the coated side of the fabric facing the smooth steel roll, a total pressure of about 15 tons is exerted on the material as it passes between the rolls.

Next, the coated and smooth-calendered material is passed through a cooling zone, followed by the application of 0.4 oz. per sq. yd. (dry weight) to the uncoated (back) side of the size composition of Example 1 and method of applying it is the same as in Example 1.

To enhance the printability of the product, the front side is embossed in a grain commonly used on impregnated bookcloth to be lithographed, employing a conventional engraved-roll embossing apparatus.

The product of this example is an outstanding white impregnated bookcloth, with lithographic printability at least as good as standard pyroxylin bookcloth, and with durability definitely superior thereto. When the product is subjected to the tumble test described in Example 1, along with pyroxylin-coated control samples, its resistance to wear and abuse is found to be markedly superior to that of a conventional white pyroxylin impregnated bookcloth. The book cover qualities and printability of the present product are substantially equal to those listed for the product of Example 3. In view of the absence of a solution-applied cellulose nitrate top coat or other protective layer of unplasticized resin, the excellent lithographing qualities of this product are surprising. Contrary to what usually happens when lithographing an unprotected latex-coated bookcloth, there is no appreciable tendency of the printed work to "smudge"; that is, after several thousand impressions the printed lines remain distinct, solid-color areas remain solid and unprinted areas remain white.

The low level of undesirable water extractable substances present in the dried coating composition of this example which tend to reduce the surface tension of water is demonstrated by casting the coating on a glass plate to a thickness sufficient to yield a dry film of two ounces per sq. yd. After the film is oven dried and stripped from the plate, at 5 gm. sample thereof is cut into small pieces (¼ in. square), placed in a 125 ml. Erlenmeyer flask containing 50 ml. of distilled water, and shaken for 2 hours at one cycle per second. The surface tension of the water in the flask is then measured with a Du Nouy tensiometer and is found to be 52.5 dynes per cm.

When making a bookcloth for lithography in accordance with this invention which will not receive a protective coating, it is essential that the coating composition used yield a value of at least 45 and preferably above 50 dynes per cm. when subjected to the above surface tension test. This is important in view of the water which is normally applied to the lithographic printing elements during the printing operation.

A durable book cover material having useful lithographic qualities can be made by repeating the above example except for applying the 1.8 oz. per sq. yd. (dry weight) of the coating composition in one coat instead of two.

In each of the following three examples a white impregnated bookcloth with properties and utility similar to the product of Example 6, is produced by repeating Example 6 except for the substitution of the coating compositions indicated below for that of Example 6.

| Coating Composition | Parts by Weight (Dry Basis) | | |
| --- | --- | --- | --- |
| | Ex. 7 | Ex. 8 | Ex. 9 |
| Rutile titanium dioxide | 10 | 14 | 7 |
| "Camelwite" calcium carbonate | 20 | 30 | 10 |
| "Rhoplex" B-15 | 20 | 34 | 24 |
| "Geon" 450X6 | 35 | 22 | 59 |
| "Chemigum" 246 [1] | 15 | | |
| | 100 | 100 | 100 |

[1] Aqueous dispersion of a copolymer of about 67% butadiene and 33% acrylonitrile, 40% solids.

It is to be understood that all of the above examples are merely illustrative, and that the present invention broadly comprises making printable coated fabrics having particular utility as book cover materials by the general method of coating a fabric with an aqueous dispersion coating composition as previously described comprising a pigment and certain synthetic polymers in the required proportions.

One of the two essential polymers making up the film former in the aqueous dispersion is a vinyl chloride polymer, which can be either polyvinyl chloride or a copolymer derived from at least 50% of vinyl chloride and up to 50% of one or more of other ethylenically unsaturated monomers copolymerizable therewith, for example, vinyl acetate, vinylidene chloride, ethylfumarate, diethyl maleate and the like. This polymer is an important part of the film former of the aqueous dispersion, contributing strength and wear resistance to the final product.

The other essential polymer making up the film former in the aqueous dispersion is an acrylic copolymer formed by reacting a lower alkyl ester of acrylic and/or methacrylic acid with acrylic, methacrylic and/or itaconic acid. The acrylic copolymers which are useful in practicing this invention are those formed by copolymerizing (on a weight basis) about 94 to 99% of at least one member of the group consisting of methyl, ethyl, propyl and butyl esters of acrylic and methacrylic acids with about 1 to 6% of at least one of the three above-mentioned acids. The copolymerization reaction can be performed by emulsifying the ingredients in a quantity of water with a non-ionic emulsifying agent, adding a suitable catalyst (e.g., peroxide or free-radical type) and allowing an exothermic reaction to occur at 60° C. (in the manner of Example A of U.S. Patent 2,757,106). Useful copolymers are also made by reacting the resultant emulsified copolymer with a basic metallic compound, namely an oxide, hydroxide or basic salt of a polyvalent metal, as taught in U.S. Patent 2,757,106, whereby a cross-linked copolymer results.

The acrylic copolymers which are particularly preferred in accordance with this invention are the products of emulsifying with a non-ionic emulsifying agent and copolymerizing a mixture containing, on a weight-of-reactant basis, about 80–90% ethyl acrylate, 4–20% methyl methacrylate and 1–6% methacrylic acid. Without the acrylic copolymer in the coating composition the final product would be deficient in flexibility and toughness.

A third film-forming polymer which is often preferred in the aqueous dispersion as a replacement for part of the acrylic copolymer is a copolymer of butadiene and acrylonitrile of the type disclosed in U.S. Patent 1,973,000.

Another essential ingredient of the aqueous dispersion used for coating the fabric is a finely divided inert substance in the form of a pigment, which renders the dry coating colored and relatively opaque.

Additional finely divided inert material of the type known as fillers can be added to supplement the action of the pigment. Suitable pigments and fillers are well known in the art; the selection of the particular ones and the amount to be employed will be dictated largely by the desired color the coating, the bridging characteristics of the polymer dispersion, and the amount of improvement needed in heat stability and freedom from tackiness.

The aqueous dispersion coating composition can also contain various additives and modifiers, such as thickeners, dispersing agents and plasticizers. However, when making a bookcloth which is to be decorated by lithography, extreme care must be exercised not to use dispersing agents or other extractable additives in such amount as to cause the work to smudge or the printing plate to go "blind." And when conventional liquid plasticizers such as tricresyl phosphate are added, the proportion should be kept to a minimum to avoid exudation during blanking, poor ink adhesion, and marring of the finishes on book shelves. To achieve maximum water resistance in the product, it is best to use a minimum of water-soluble or water-sensitive ingredients.

For each 100 parts by weight of total film former present, the aqueous dispersion can contain from about 10 to 100 parts of finely divided inert material, i.e., pigment, or pigment plus filler when both are used. The preferred amount of pigment and filler for a particular dispersion will be determined by such factors as the water absorption capacity of the inert material, polymer concentration, ratio of soft polymer to hard polymer, and the considerations mentioned above. However, with the preferred range of polymer concentrations and ratios, the optimum amount of inert material will usually be from about 30 to about 50 parts per 100 parts of film former. Too little inert material is evidenced by a coating with insufficient color or opacity, voids, tackiness, poor abrasion resistance and low blocking temperature. On the other hand, too much inert material leads to a stiff and brittle product with tendency for the coating to crack and the color to rub off.

The film former, on a percent by weight basis, consists of about 25–75% vinyl chloride polymer, 25 to 75% acrylic copolymer, and optionally up to about 35%, preferably not over 20%, of a copolymer of butadiene and acrylonitrile, with the latter preferably not exceeding the amount of acrylic copolymer present. The optimum ratio of the vinyl chloride polymer to the modifying copolymer or copolymers will vary according to such factors as the amount of inert material present, the hardness of each of the polymers used, and the compatibility of the individual polymer dispersions being blended together. It will thus be understood that the proportion of vinyl chloride polymer can approach its maximum when the amount of inert material approaches its specified minimum, when the softer grades of the specified modifying polymers are used, when the respective polymer latices are compatible in the required proportions, and/or when the softer grades of the specified vinyl chloride polymers are used. The properties desired in the finished product will of course also be a determining factor in the proportion of ingredients to be employed. When the product is used as a book cover, the presence of an excessive proportion of one of the harder vinyl chloride polymer results in undue stiffness, excessive wear and cracking at edges and corners, and reduced hinge life. Too little vinyl chloride polymer on the other hand is evidenced by a soft and tacky surface.

The amount of coating applied to the fabric substrate for use as bookcover material is preferably about 1.5 to 3.5 ounces per square yard.

The sand grinding method mentioned previously is the preferred method of dispersing the pigment and filler into the polymer dispersion. Other known methods of intimately dispersing pigments with polymer dispersions, such as ball-milling and 3-roll-milling, are also suitable.

The ingredients are preferably mixed in the order which results in the least foaming and the best compatibility of the separate latices employed, points which can be determined readily by those skilled in the art.

In order to minimize shrinkage of the fabric, it is usually best to have the fabric mounted in a tenter frame or equivalent apparatus during the drying operations. Economic considerations ordinarily make it advisable to employ a dispersion concentration and a coating method capable of depositing the required weight of coating in the least possible number of coats consistent with good surface properties, such as smoothness and freedom from macroscopic voids. When making a so-called impregnated bookcloth, the requisite coating weight can often be applied in a single application by doctor knife or equivalent means, due to the excellent bridging properties possessed by the compositions of this invention.

Smooth calendering of the coated fabric, while not an essential step in the strictest sense, is ordinarily preferred to achieve the desired surface properties, both with respect to printing and to general appearance and durability.

The substrate to which the aqueous dispersion is applied can be any woven or non-woven fabric or fibrous web having the necessary strength, weight and smoothness for the intended end use.

Although usefulness of the product of this invention as a book cover material has been emphasized, it will be understood that the product will also have utility in connection with other products requiring a durable flexible covering which can be printed by such practical methods as lithography and ink stamping. A few such products are luggage, typewriter covers, and cases for cameras, projectors, binoculars, and spectacles.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

The embodiments of the invention in which an exclusive property or privilege is claimed are defined as follows:

1. As a new article of manufacture, a printable coated fabric comprising a fabric substrate having deposited on one side thereof a coating consisting essentially of (A) a mixture of synthetic polymers and (B) finely divided inert material including at least one pigment, said coating containing about 10 to 100 parts of (B) per 100 parts of (A); component (A) consisting of (1) about 25 to 75% of a vinyl chloride polymer selected from the group consisting of polyvinyl chloride and copolymers of at least 50% vinyl chloride and up to 50% of another ethylenically unsaturated monomer, (2) about 25 to 75% of an acrylic copolymer composed of about 94 to 99% of at least one member of the class consisting of the methyl, ethyl, propyl and butyl esters of acrylic and methacrylic acids, and about 1 to 6% of at least one member of the class consisting of acrylic, methacrylic and itaconic acids, and (3) up to 35% of a copolymer of butadiene and acrylonitrile, all of said parts and percentages being on a weight basis.

2. The product of claim 1 wherein said coating weighs about 1.5 to 3.5 ounces per square yard.

3. The product of claim 1 wherein said acrylic copolymer is composed of about 80 to 90% ethyl acrylate, 4 to 20% methyl methacrylate and 1 to 6% methacrylic acid.

4. An improved colored book cover material having the capacity to be printed comprising a woven fabric having deposited on one side thereof a coating consisting essentially of (A) a mixture of synthetic polymers and (B) finely divided inert material including at least one colored pigment, said coating containing about 30 to 50 parts of (B) per 100 parts of (A); component (A) consisting of (1) about 25 to 75% of a vinyl chloride polymer selected from the group consisting of polyvinyl chloride and copolymers of at least 50 vinyl chloride and up to 50% of a member of the class consisting of vinyl acetate and vinylidene chloride, (2) about 25 to 75% of an acrylic copolymer composed of about 80 to 90% ethyl acrylate, 4 to 20% methyl methacrylate and 1 to 6% methacrylic acid, and (3) up to about 20% of a copolymer of butadiene and acrylonitrile, all of said parts and percentages being on a weight basis.

5. An improved book cover material having the capacity to be printed by known lithographic methods comprising a woven fabric having deposited on one side thereof a coating weighing 1.5 to 2.0 ounces per sq. yd. of a composition consisting essentially of (A) a mixture of synthetic polymers and (B) finely divided inert material including a pigment, said coating containing about 30 to 50 parts of (B) for each 100 parts of (A); component (A) consisting of (1) about 25 to 75% of a vinyl chloride polymer selected from the group consisting of polyvinyl chloride and copolymers of at least 50% vinyl chloride and up to 50% of a member of the class consisting of vinyl acetate and vinylidene chloride (2) about 25 to 75% of an acrylic copolymer composed of about 80 to 90% ethyl acrylate, 4 to 20% methyl methacrylate and 1 to 6% methacrylic acid, and (3) zero to 20% of a copolymer of butadiene and acrylonitrile, all of said parts and percentages being on a weight basis, said coating yielding a solution having a surface tension of at least 45 dynes per cm. when a 5 gram sample of the coating is placed in 50 ml. of distilled water and shaken for 2 hours.

6. A method of making a printable coated fabric which comprises applying to a fabric substrate a layer of an aqueous dispersion consisting essentially of (A) a mixture of synthetic polymers and (B) finely divided inert material including at least one pigment, and drying said layer; said dispersion (A) comprising about 10 to 100 parts of (B) for each 100 parts of (A); component (A) consisting of (1) about 25 to 75% of a vinyl chloride polymer selected from the group consisting of polyvinyl chloride and copolymers of at least 50% vinyl chloride and up to 50% of another ethylenically unsaturated monomer, (2) about 25 to 75% of an acrylic copolymer composed of about 94 to 99% of at least one member of the class consisting of methyl, ethyl, propyl and butyl esters of acrylic and methacrylic acids, and about 1 to 6% of at least one member of the class consisting of acrylic, methacrylic and itaconic acids, and (3) up to 35% of a copolymer of butadiene and acrylonitrile, all of said parts and percentages being on a weight basis.

References Cited in the file of this patent

UNITED STATES PATENTS

| | | |
|---|---|---|
| 2,125,527 | Tyce et al. | Aug. 2, 1938 |
| 2,690,981 | Funk et al. | Oct. 5, 1954 |
| 2,754,280 | Brown et al. | July 10, 1956 |

OTHER REFERENCES

Serial No. 397,138, Fikentscher et al. (A.P.C.), published May 11, 1943.

UNITED STATES PATENT OFFICE
CERTIFICATE OF CORRECTION

Patent No. 2,989,423                                  June 20, 1961

Alfred Bruce Malmquist et al.

It is hereby certified that error appears in the above numbered patent requiring correction and that the said Letters Patent should read as corrected below.

Column 3, lines 47 and 48, strike out "suspend the pigment and filler in the "Rhoplex" B-15. considerable"; column 6, line 53, for "at" read -- a --; column 7, line 66, for "acqueous" read -- aqueous --.

Signed and sealed this 14th day of November 1961.

(SEAL)
Attest:

ERNEST W. SWIDER                                      DAVID L. LADD
Attesting Officer                                             Commissioner of Patents
                                                                                       USCOMM-DC